W. V. TURNER.
COMBINED SWAB HOLDER AND NUT LOCK.
APPLICATION FILED NOV. 18, 1916.
1,266,729.
Patented May 21, 1918.
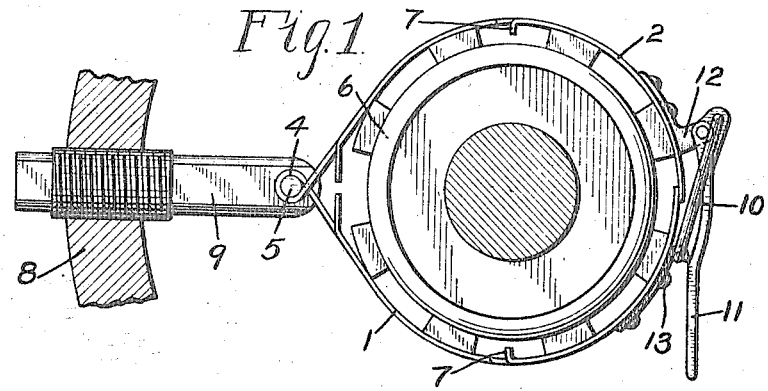
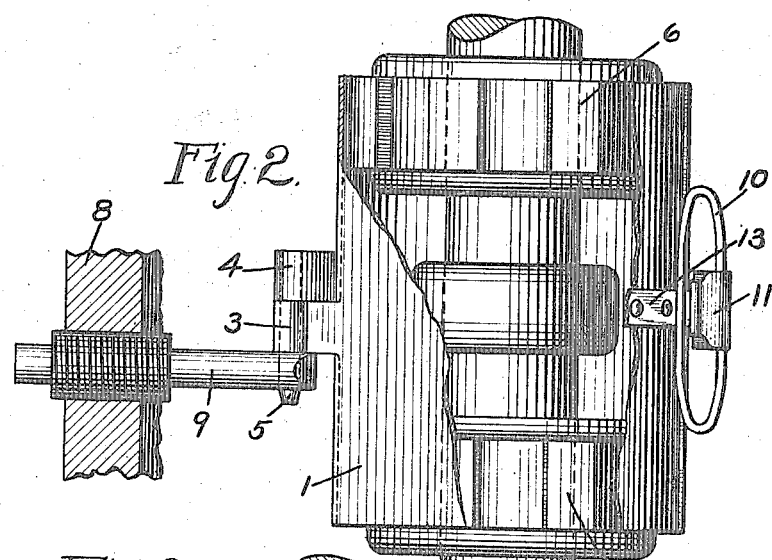
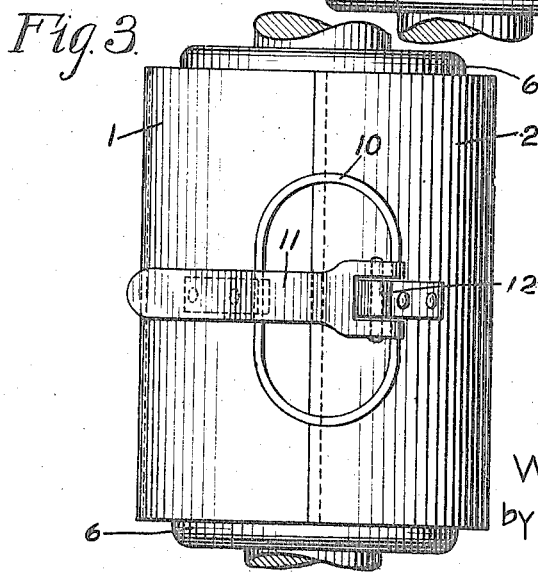
INVENTOR
Walter V. Turner
by Wm. M. Cady
Atty.

UNITED STATES PATENT OFFICE.

WALTER V. TURNER, OF WILKINSBURG, PENNSYLVANIA, ASSIGNOR TO THE WESTINGHOUSE AIR BRAKE COMPANY, OF WILMERDING, PENNSYLVANIA, A CORPORATION OF PENNSYLVANIA.

COMBINED SWAB-HOLDER AND NUT-LOCK.

1,266,729.   Specification of Letters Patent.   Patented May 21, 1918.

Application filed November 18, 1916. Serial No. 132,236.

*To all whom it may concern:*

Be it known that I, WALTER V. TURNER, a citizen of the United States, residing at Wilkinsburg, in the county of Allegheny and State of Pennsylvania, have invented new and useful Improvements in Combined Swab-Holders and Nut-Locks, of which the following is a specification.

This invention relates to a combined swab protector and nut lock, adapted more particularly for steam driven air compressors.

The principal object of my invention is to provide a generally improved construction of the above character.

In the accompanying drawing, Figure 1 is a plan view of a combined swab protector and nut lock embodying my invention, as applied to the stuffing box nuts of a steam driven air compressor; Fig. 2 a side elevation thereof; and Fig. 3 a front elevation thereof.

As shown in the drawing, the device may comprise a casing formed of semi-cylindrical sections 1 and 2 having rear hinge members 3 and 4 secured together by a hinge pin 5 and adapted to encircle the stuffing box nuts 6.

In order to lock the nuts 6, the casing sections 1 and 2 are provided with inwardly extending tongues 7, adapted to extend into the notches of the nuts 6 which are provided for the spanner wrench.

The wall 8 of the compressor at the rear of the stuffing box nuts is tapped and a stud 9 is screwed into same, to form a support for the swab holder.

For this purpose, the inner end of the stud is drilled for the reception of the hinge pin 5, which extends beyond the hinge member 3, as shown.

In order to clamp the casing sections 1 and 2 together, a latch device may be provided having a ring 10 pivotally mounted on a cam lever 11. The cam lever is pivoted on a lug 12 secured to the casing section 2 and the ring 10 is adapted to engage over a hook 13 secured to the casing member 1.

The swab protector and nut lock is applied by releasing the latch device to permit the casing sections 1 and 2 to open up and then the casing is applied to the stuffing box nuts and turned around until the pin 5 is in position to drop into the hole provided in the stud 9.

The casing sections 1 and 2 are then closed in on the stuffing box nuts, the ring 10 is applied to the hook 13, and the cam lever 11 is turned to the position shown in Fig. 1 of the drawing, so as to clamp the casing sections together.

By the above construction, the casing may be opened up to permit adjustment of the stuffing box nuts without removing same and at the same time reduces the possibility of the protector being lost or thrown away.

Furthermore, the device being held in position by the stud, the casing sections are prevented from rotating so that the casing can be more easily unlocked and opened up.

Having now described my invention, what I claim as new and desire to secure by Letters Patent is:

1. In a combined swab protector and nut lock, the combination with a casing inclosing the nuts, of a member for supporting the casing in position.

2. In a combined swab protector and nut lock for fluid compressors, the combination with hinged casing sections inclosing the stuffing box nuts of the compressor, of means secured to the compressor for holding the casing sections in position.

3. The combination with stuffing box nuts, of a compressor having a wall at the rear of the nuts, of hinged casing sections inclosing the nuts and a stud carried by said rear wall of the compressor for supporting the casing sections in position.

In testimony whereof I hereunto set my hand.

WALTER V. TURNER.

Copies of this patent may be obtained for five cents each, by addressing the "Commissioner of Patents, Washington, D. C."